T. EYNON.
MILLING TOOTH.
APPLICATION FILED JAN. 29, 1908.
959,328.
Patented May 24, 1910.
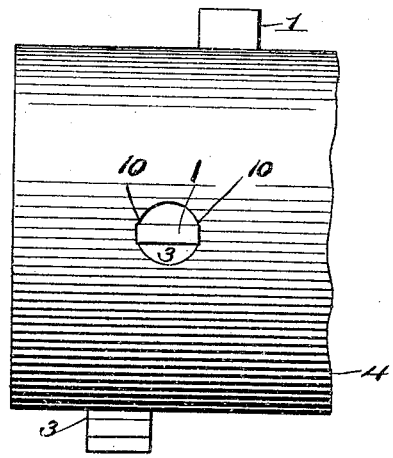
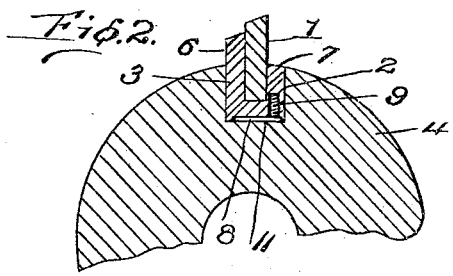
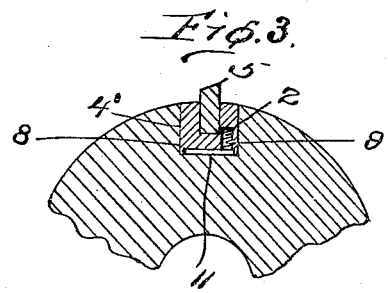
Witnesses
J. M. Fowler Jr.
A. S. Kitchin
Inventor
Thomas Eynon
By Mason Fenwick Lawrence
his Attorneys

UNITED STATES PATENT OFFICE.

THOMAS EYNON, OF CHICAGO, ILLINOIS.

MILLING-TOOTH.

959,328.  Specification of Letters Patent.  Patented May 24, 1910.

Application filed January 29, 1908. Serial No. 413,300.

*To all whom it may concern:*

Be it known that I, THOMAS EYNON, a citizen of the United States, residing at Chicago, in the county of Cook and State of Illinois, have invented certain new and useful Improvements in Milling-Teeth; and I do hereby declare the following to be a full, clear, and exact description of the invention, such as will enable others skilled in the art to which it appertains to make and use the same.

This invention relates to milling devices and more particularly to the means for securing the teeth in the milling head.

The invention comprises a milling head formed with apertures therein for accommodating milling teeth of various shapes, and also for accommodating preferably circular retaining means for holding the said teeth in place.

It further consists in the production of means for assisting the milling tooth to resist pressure exerted thereon when in operation.

It also consists in the production of supporting members for holding the cutting teeth firmly in place in the milling head.

The object in view, is the production of means for rigidly holding milling teeth in a milling head and the retention of the same from any independent movement whatever.

Another object in view, is the production of supporting members, so formed as to hold the teeth of the milling cutter rigidly in place and at the same time assist in withstanding the pressure exerted thereon during the cutting operation.

With these and other objects in view, the invention comprises certain novel constructions, combinations and arrangements of parts as will be hereinafter fully described and claimed.

In the accompanying drawings:—Figure 1 is a plan view of part of a milling head with my invention attached thereto. Fig. 2 is a fragmentary sectional view through the milling head and my invention. Fig. 3 is a sectional view through part of a milling head, showing a slightly modified form of my invention.

In the constructing of milling teeth it has been common to form the same rectangular or polysided in transverse section, but the forming of a milling head with apertures of a corresponding shape has been more or less difficult and it is found much easier to provide cylindrical openings for the reception of milling teeth so that it has become common to utilize a cylindrical steel rod of superior quality for forming the milling teeth and in order to provide a cutting edge, the rod has usually been split longitudinally, centrally, and a portion of one of the halves removed so that the other half is exposed with its squared edge. This, it will be seen, involves the best quality of steel for the entire body, and, as said steel is comparatively expensive, it is believed to be decidedly beneficial to provide for the saving of a portion of the material used, and by the present invention I propose to save at least one-half or more of the more expensive material. This result is attained in the simplest and most effective manner by the use of the several elements as indicated in the drawings, in which the tooth 1 is made from a substantially flat bar of preferably self hardening steel. This tooth as will be evident from the drawings, may be simply broken off from the commercial steel bars as they come from the factory and without reheating or further working the same, and then may be ground so as to be used as cutting teeth. In the use of flat steel bars for teeth as just indicated, applicant preferably secures them in place in suitable apertures 2 by supporting member 3. The apertures are preferably made cylindrical and extend only partially through the cylinder, so as not to weaken the milling head or cylinder 4 any more than is absolutely necessary. In making small milling heads, it is found that great care is necessary to be observed in the placing of the apertures for receiving milling teeth, in order that the same will not unduly weaken the head. In order to properly hold the tooth 1 in position, the supporting members 3 are made arc shaped on their periphery but flat on the opposite side, so as to form with the tooth 1 nearly a cylindrical body tightly fitting the aperture 2. The width of the tooth 1 is preferably equal to the diameter of an aperture in the cylinder so that owing to the circular form of the aperture the corners of the tooth cut into the material of the head and prevent turning as shown at Fig. 1.

In inserting the teeth, the same may be placed in position in the supporting member, and said members forced in afterward, or the supporting members may be first placed in position and the tooth forced in last. In case the latter is done, it will be necessary to grind the tooth to proper edge after the same has been inserted. As will be observed from the drawing, the aperture for receiving the milling tooth and its supporting members is formed with a flat bottom at right angles to the walls of the aperture. The aperture is formed with this kind of bottom in order that the milling teeth may be ground into proper shape and size, so that when they are inserted into the milling head, they will come perfectly true.

The supporting member 3 is made from any of the ordinary cheap metals, and is formed with extensions 6 and 7 and a base portion 8, which tightly fits the aperture and when in position rests upon the bottom of the same. Supporting member extension 7 projecting from the disk portion 8 extends only to the periphery of the milling head, while the supporting member extension 6 also formed integral with the disk portion 8 extends any suitable distance above the periphery of the milling head, so as to assist the tooth 1 in withstanding pressure exerted thereon during the cutting operation. As will be evident from this construction, the same permits the use of high grade material for the tooth proper and allows the use of cheaper material for the supporting members, which are so formed as to require the minimum amount of expensive steel being used in the tooth 1. In inserting a milling tooth as shown in Fig. 2, the milling tooth 1 is preferably formed into proper shape and then pressed in between the supporting member extensions 6 and 7 of the supporting member 3 which will permit the insertion of said tooth without any difficulty, as the same will spring or give sufficiently for the easy assembling of the tooth with said wedge extensions. When the tooth and supporting member extensions or filling is assembled, the same is forced into the aperture 2, pressure being applied to the supporting members. In this way the teeth may be inserted without injury to the same and yet fitted to the milling head in proper position without further operation upon the tooth itself. If preferable however, the supporting member may be first placed in the aperture 2 and then a piece of high class steel forced between the same and then ground into proper shape for cutting.

In fitting a milling head with my form of milling teeth, I preferably form them in spiral rows around said milling head so as to give a staggered effect to the same. It is also desirable to insert as few teeth as will properly accomplish the work desired, so as to not weaken the milling head any more than absolutely necessary. By the use of my improved tooth and supporting members therefor, it will be evident that the same will stand considerable pressure exerted thereon without deteriorating or breaking and therefore need not be placed very close together.

It will be evident that from the various forms of teeth as used by me, the main object of the invention is accomplished, in that a considerable saving of high priced steel is made and that the tooth may be accurately positioned within the milling head and without the exercise of any expert skill on the part of the mechanic. Another advantage secured by the structure herein disclosed is that the tooth may be inserted in the milling head without injuring the same in any way.

The supporting member 3 is formed with one side higher than the other for acting as a brace as shown at 6. The bottoms of the supporting members 3 are formed with hollowed out portions 11. Connected with the hollowed out portions 11 are cylindrical hollowed out apertures or bores 9. Bores 9 may be dispensed with if desired but the hollowed-out portion 11 is of importance in the removal of the supporting members after the cutting tooth or member 1 has worn down until it is necessary to insert a new tooth or tool. When it is desired to remove supporting member 3 a hole is bored from above down into and in connection with aperture or bore 9 if the same is being used, and if the bore 9 is not being used an aperture or hole is bored entirely through one side of the supporting member 3 until cut-out portion 11 is reached. Hydraulic pressure is then applied to this hole and as the same passes downward and enters into the chamber formed by cut-away portion 11 the pressure exerted upon the base of the supporting member 3 will force the same out. This will leave the aperture or hole in the milling head in good shape for receiving another supporting member and tool. If desired of course the original supporting member 3 may be replaced with a new tool. It will also be evident that the hole bored through supporting member 3 to connect with bore 9 may be threaded for permitting the pipe carrying the hydraulic pressure to be secured thereto if desired. It will also be noted that supporting member 3 is made of soft material and a comparatively cheap grade of material so as to be of small expense but perform efficiently all the objects intended.

In Fig. 3 will be seen a slightly modified form of supporting member 4' for accommodating a tool 5. The supporting member 4' is arranged to have its upper end flush with the cylinder and to permit the tooth of cutting member 5 to project beyond the periphery of the cylinder. The supporting member 4' is made with a plurality of cavities or apertures similar to the structure shown in Fig. 2, and will therefore need no further description, the modification lying merely in the fact that the supporting member 4' is made flush with the cylinder instead of having a bracing extension project beyond one side of the tooth or tool 5.

In inserting the tool 1 or 5, as the case may be, the same is designed to be slightly larger than the aperture as 2 in the milling head so that when the supporting member and the tool are forced into position the same will slightly groove or cut away the milling head as seen in Fig. 1 at 10. It is designed to have the aperture 2 of such size that only the corners of the tool 1 or 5 will cut or groove the milling head. This will positively prevent any twisting or turning of the cutting tool.

Having now described my invention, what I claim as new and desire to secure by Letters Patent is:—

1. In a device of the character described, a milling head having an aperture formed therein, a tool securing member positioned in said aperture and formed with a tool receiving aperture, said tool securing member being formed with a primary cavity and an auxiliary cavity, said auxiliary cavity being connected with the primary cavity and adapted to be connected with hydraulic pressure for forcing the tool securing member out of the aperture formed in the milling head, and a tool positioned in the aperture in said tool securing member.

2. In a device of the character described, a milling head having an aperture formed therein, a securing member positioned in the aperture and provided with an upstanding tool bracing projection projecting beyond the milling head, said securing member being formed with an aperture for receiving a cutting tool, and a cavity adapted to receive hydraulic pressure for forcing the securing member out of the aperture formed in the milling head.

3. In a device of the character described, a milling head having an aperture formed therein, a securing member formed with a cavity positioned in said aperture, and a cutting tool positioned in said cavity and extending beyond the securing member, said securing member being formed with an aperture beneath the cutting tool, and a second aperture connected therewith designed to receive hydraulic pressure for the purpose of forcing the securing member out of engagement with the milling head.

4. In a device of the character described, a milling head, an aperture formed therein, a securing member positioned in the aperture and provided with a cavity adapted to receive a cutting tool, a second cavity formed in the receiving member and having threads formed internally thereof, and adapted to receive a fluid for forcing the securing member out of engagement with the milling head.

In testimony whereof I affix my signature in presence of two witnesses.

THOMAS EYNON.

Witnesses:
   OTTO A. KAUFMAN,
   PETER W. FLOOD.